Sept. 25, 1962

B. B. BAUER 3,055,988

MAGNETIC PHONOGRAPH PICKUP

Filed April 8, 1957

4 Sheets-Sheet 1

INVENTOR.
Benjamin B. Bauer
BY
Jones, Darbo & Robertson
Att'ys.

Sept. 25, 1962

B. B. BAUER 3,055,988

MAGNETIC PHONOGRAPH PICKUP

Filed April 8, 1957

4 Sheets-Sheet 2

INVENTOR.
Benjamin B. Bauer
BY
Jones, Darbo & Robertson
Att'ys.

Sept. 25, 1962

B. B. BAUER 3,055,988

MAGNETIC PHONOGRAPH PICKUP

Filed April 8, 1957

4 Sheets-Sheet 3

INVENTOR.
Benjamin B. Bauer
BY
Jones, Darbo & Robertson Attys.

Sept. 25, 1962

B. B. BAUER 3,055,988

MAGNETIC PHONOGRAPH PICKUP

Filed April 8, 1957

4 Sheets-Sheet 4

INVENTOR.
Benjamin B. Bauer
BY
Jones, Darbo & Robertson
Attys 3,055,988
MAGNETIC PHONOGRAPH PICKUP
Benjamin B. Bauer, Oak Park, Ill., assignor to Shure Brothers, Incorporated, Evanston, Ill., a corporation of Illinois
Filed Apr. 8, 1957, Ser. No. 651,404
7 Claims. (Cl. 179—100.41)

This invention relates to mechano-electric transducer devices for phonograph reproducers, commonly referred to as phonograph pickups, and particularly to the magnetic type of pickup having a permanent magnet armature.

The principal purpose of the invention is to provide a phonograph pickup capable of producing electrical output signals of exceptionally high fidelity. This object contemplates a structure in which the moving system has minimum inertia by reason of low mass and small moment arm about the axis of oscillation. The structure is highly adaptable in that optimum characteristics of stiffness, compliance, and damping may be introduced where and as needed in the several elements of the device whereby the highly desired fidelity of reproduction is obtainable.

A further object of the invention is to provide a pickup having maximum protection from extraneous noise-producing fields. In this aspect of the invention, a symmetrical magnetic core structure is provided to minimize the effect of such stray fields.

Another object of the invention is to provide a compact magnetic type of pickup having two needles. A further object of the invention is to provide certain features of construction calculated to overcome problems heretofore existing in this type of pickup, particular reference being made to the precise orientation of the permanent magnet armature at the electromagnetic core gap upon replacement of the needle-armature, as required. A further general objective of the invention is to provide a phonograph pickup of the magnetic type which is simple in construction and which may be manufactured at relatively low cost.

Additional objects and advantages of the invention will become apparent as the description proceeds in conjunction with the accompanying drawings, in which—

Figures 1, 2, 3, 4, 5, 6, 7, 8:
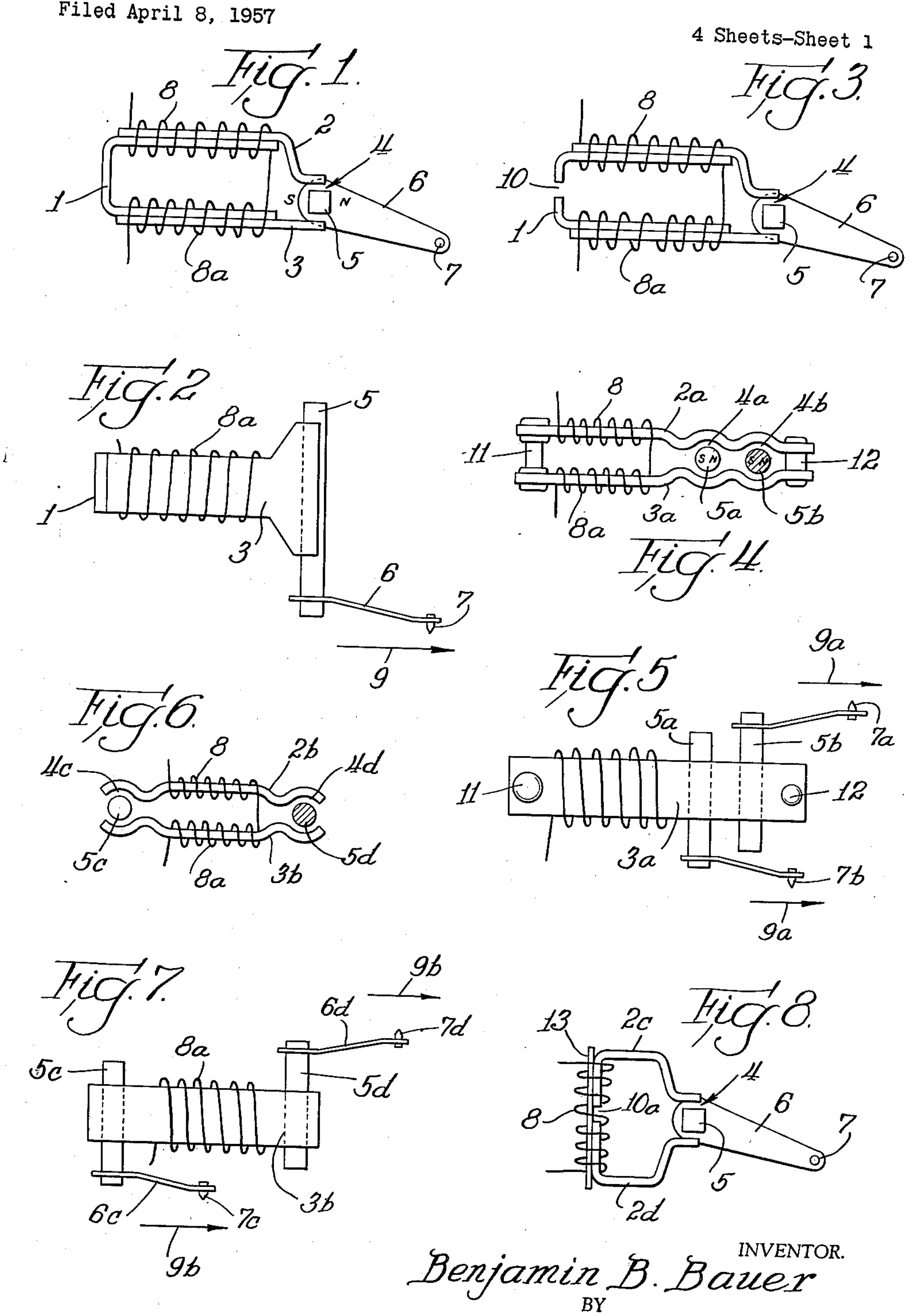
FIG. 1 is a diagrammatic top view of the arrangement of the elements of one form of the invention.
FIG. 2 is a side view of the device illustrated in FIG. 1.
FIG. 3 is a diagrammatic top view of a modified form of the pickup system shown in FIG. 1.
FIG. 4 is a diagrammatic top view of the two-needle embodiment of the pickup system.
FIG. 5 is a side view of the device of FIG. 4.
FIG. 6 is a diagrammatic top view of a different form of a two-needle pickup system.
FIG. 7 is a side view of the device of FIG. 6.
FIG. 8 is a diagrammatic top view of the essential elements of a pickup having a single coil and balanced magnetic core gap.
Figure 9:
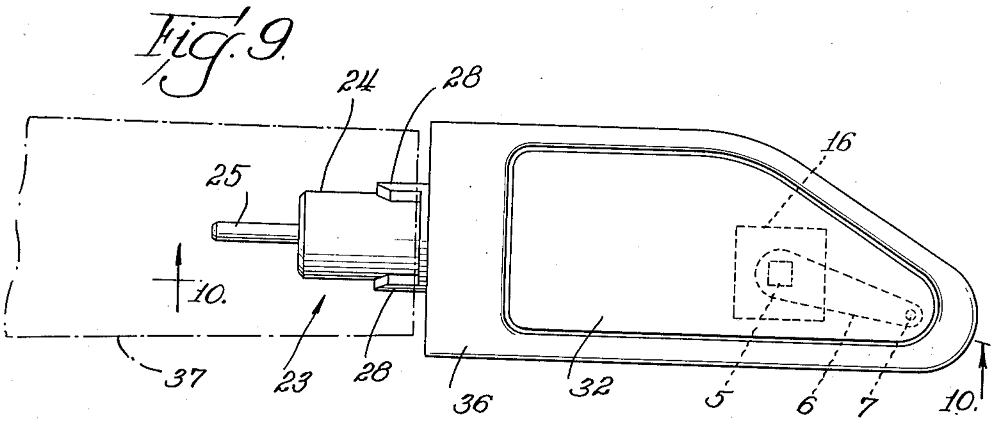
FIG. 9 is a top view of a complete pickup cartridge embodying the invention.
Figures 10, 11, 12, 13:
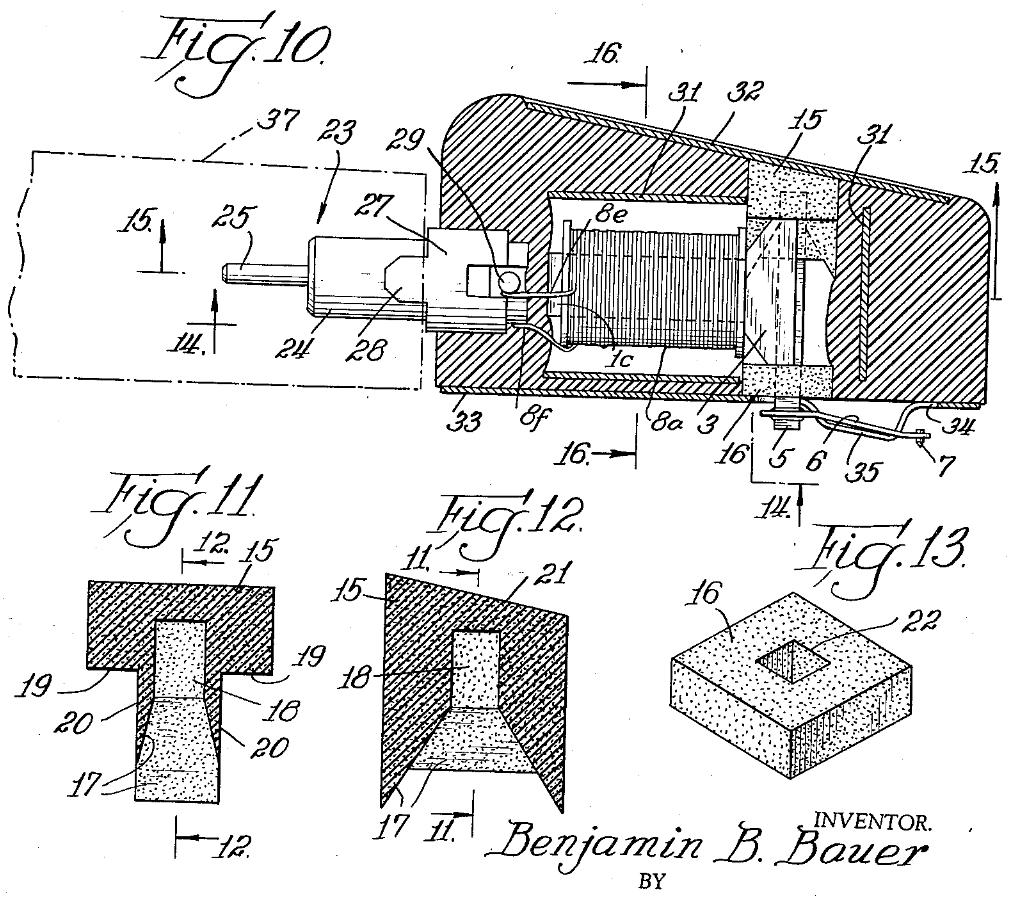
FIG. 10 is a longitudinal sectional view of the cartridge of FIG. 9, taken at the line 10—10 of FIG. 9.
Figure 14:
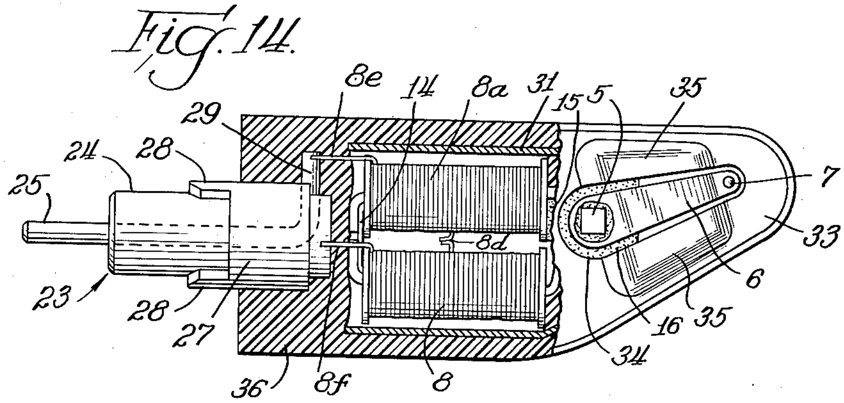
Figures 15, 16, 17:
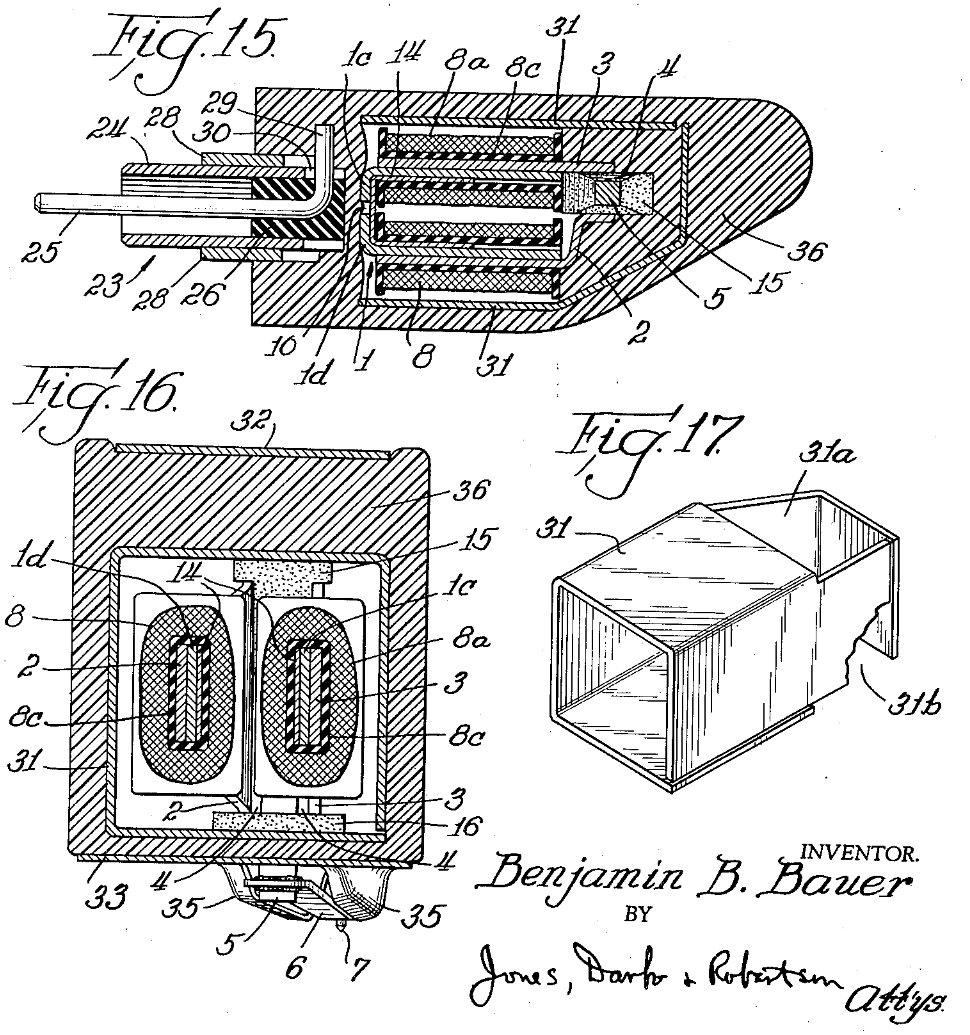
Figure 18:
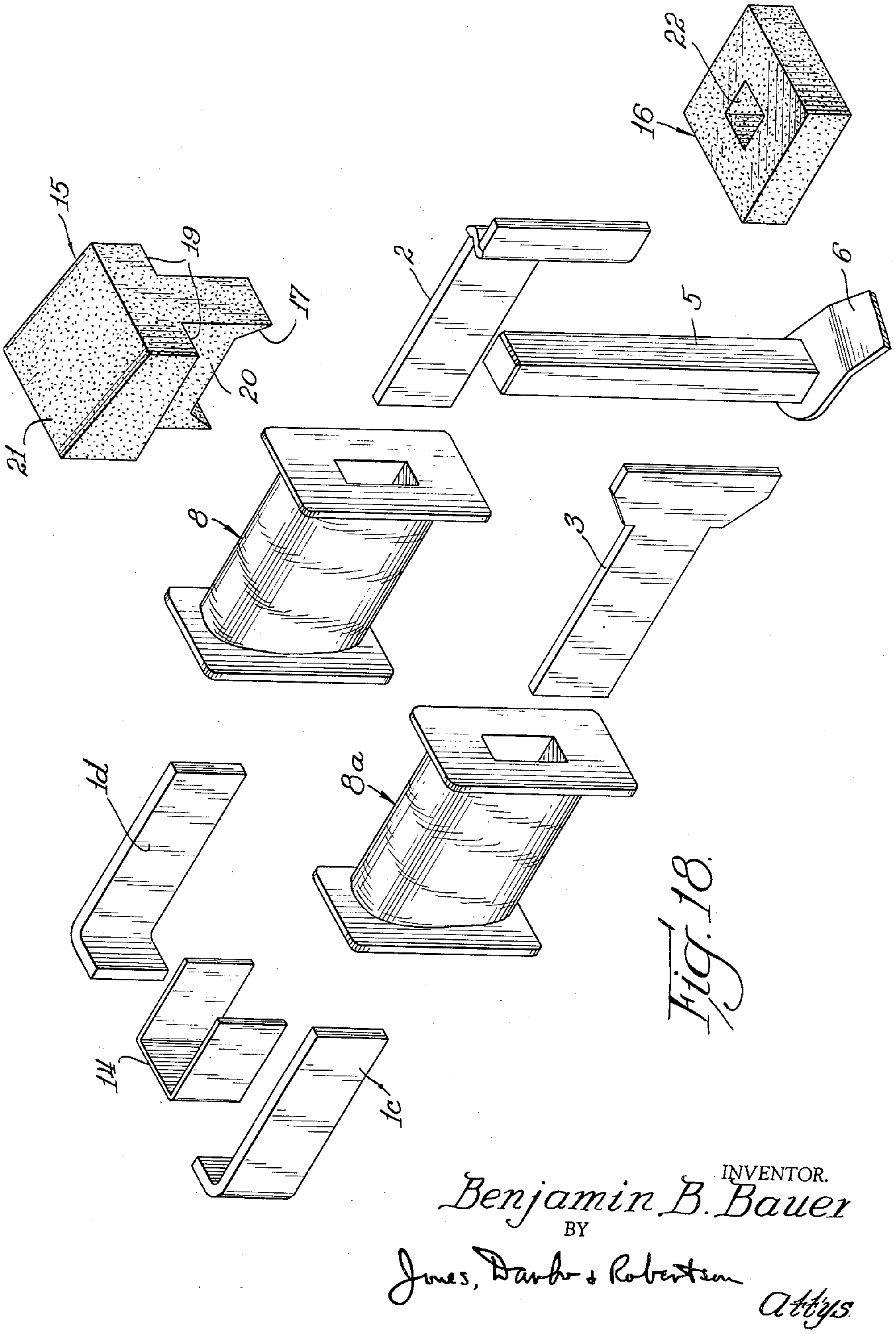

FIGS. 11 and 12 are cross-sectional views showing details of the upper armature bearing and socket, FIG. 11 being taken at the line 11—11 of FIG. 12 and FIG. 12 being taken at the line 12—12 of FIG. 11;

FIG. 13 is a perspective view of the lower armature bearing;

FIG. 14 is a bottom view, partly in section, of the phonograph pickup cartridge of FIG. 9 embodying the system of FIG. 3, taken at the line 14—14 of FIG. 10;

FIG. 15 is a horizontal sectional view, looking upwardly, of the cartridge of FIG. 9, taken at the line 15—15 of FIG. 10;

FIG. 16 is a cross-sectional view taken at the line 16—16 of FIG. 10;

FIG. 17 is a perspective view of the magnetic shielding of the pickup structure; and FIG. 18 is an exploded view showing the elements of the cartridge of FIG. 9.

For complete disclosure of all aspects of the invention, the functional elements and mechano-electrical transducer system will first be described with reference to the diagrammatic illustrations of FIGS. 1–8 and the structure of a prototype cartridge embodying one form of the transducer system will then be particularly described. It will be understood that structural features of the cartridge may be employed with any one of the several forms of transducer systems illustrated in FIGS. 1–8.

In the transducer system of FIGS. 1 and 2, a magnetic core consisting of a U-shaped element 1 and pole pieces 2 and 3 form an air gap at 4 within which is arranged a permanent magnet armature 5 having the shank 6 of a needle stylus rigidly attached thereto and extending laterally from the lower extremity thereof. A needle tip 7 is affixed in the end of the needle shank. Coils 8 and 8*a* are arranged upon the two legs of magnetic core 1. These coils are connected in series, as shown, and the turns of the respective coils are in such direction that magnetic flux passing through the core induces in the two coils electrical voltages which are additive.

As will be described in greater detail in connection with the description of the complete pickup cartridge structure, the permanent magnet armature 5 is supported in its proper position in the gap 4 by means of suitable rubber, plastic, or other resilient or elastomeric bearings which will permit oscillatory rotation of the elongated magnet about its axis. The magnet armature is driven in such axial oscillation by needle shank 6 which, in turn, follows the lateral vibrations of tip 7 as the latter follows the groove of a record disc moving in the direction indicated by arrow 9.

In the device illustrated in FIGS. 1 and 2, magnet 5 is square in cross-section and, as in all embodiments of the invention herein shown and described, the magnet is transversely magnetized. As is indicated in FIG. 1, the normal orientation of permanent magnet armature 5 in gap 4 is such that the magnet plane, as defined by the axis of magnet 5 and the opposite poles of the magnet, is normal to the axis of the gap 4, that is, to a line extending between the centers of the pole faces defining the gap.

Needle shank 6 is so constructed that it is very stiff in horizontal direction and somewhat resilient in vertical direction. These physical properties allow oscillation of magnet armature 5 about its axis in close conformity to lateral displacement of needle tip 7, while, at the same time, limited vertical accommodation is allowed for vertical excursions of the stylus due either to imperfections in the record disc or narrowing and broadening of the groove resulting in what is sometimes called "pinch effect." The needle shank 6 extends laterally from magnet 5 at an angle to the magnet plane; that is, the median line extending between the axis of magnet 5 and the axis of the needle tip 7 is at an angle to the magnet plane. The reason for this is to minimize distortion and other undesirable consequences of deviation from proper tracking of the needle in the record groove, the angular arrangement of the needle arm being provided in contemplation of use of the transducer in a straight pickup arm. The optimum magnitude of this angle for playing 10-inch and 12-inch record discs is about 18° for a pickup arm about 11 inches long.

If desired, a stylus may be attached to each end of magnet 5 whereby two different tips may be provided for playing two different types of records, suitable provision being made to bring the proper tip to bear upon the record.

In the operation of the system of FIGS. 1 and 2, the terminals of coils 8 and 8*a* are connected to a suitable amplifier. Oscillation of permanent magnet 5 results in the corresponding change of magnetic flux in the magnetic core circuit, which induces a signal voltage in the coils. This signal voltage may be amplified and reproduced by suitable audio reproduction equipment. Reproduction by means of this transducer is characterized by exceptionally high fidelity by reason of the low mass of moving system comprising the needle stylus and magnet armature, and the disposition of a substantial proportion of the mass of the moving system at and immediately surrounding the axis of the magnet which is the axis of oscillation. The structure therefore exhibits low inertia with the result that the signal-producing oscillations of the armature faithfully conform to the sound track of the record.

The transducer system illustrated in FIG. 3 is in every way similar to that of FIGS. 1 and 2 with the single exception that a second magnetic gap 10 is provided in the magnetic core at a location remote from gap 4. The core piece 1 is comprised of two L-shaped elements 1*a* and 1*b* having their adjoining ends separated to form gap 10. The purpose of the gap is to minimize noise or hum that may otherwise be induced in the magnetic core structure due to external stray magnetic fields. The size of gap 10 should be adjusted to achieve a substantially symmetrical magnetic core system.

In the two-needle transducer of FIGS. 4 and 5, two gaps 4*a* and 4*b*, provided, respectively, with permanent magnet armatures 5*a* and 5*b*, are provided in the forward end of the magnetic core. The magnetic core is formed by two identical core elements 2*a* and 3*a* held in proper relationship to each other by suitable bolts or rivets 11 and 12, the former being of magnetic material for the magnetic connection of the extremities of core elements 2*a* and 3*a* at the rearward end of the core remote from gaps 4*a* and 4*b*, bolt or rivet 12 being of a non-magnetic material.

The purpose of the dual gaps 4*a* and 4*b* of the magnetic core system of this transducer is to provide two separate needle stylus systems which may be used alternatively for reproduction from two different types of records, as, for example, standard and microgroove. Each permanent magnet armature 5*a* and 5*b* carries a stylus including a tip adapted for reproduction of sound from a particular type of record disc. For example, needle tip 7*a* may be of the proper size and character to reproduce from standard 78 r.p.m. records and tip 7*b* for reproduction from a 33⅓ r.p.m. microgroove record. The direction of movement of the record with respect to the transducer is indicated by arrows 9*a*.

The permanent magnet armatures 5*a* and 5*b* are illustrated as rods or spindles having circular cross-sections. This shape may be used alternatively to the square cross-section. Preferably, and to minimize flux leakage, the core elements 2*a* and 3*a* are somewhat curved, as shown, to form curved pole faces defining gaps 4*a* and 4*b*.

It will be understood that suitable mechanical cartridge support structure must be provided for using the transducer of FIGS. 4 and 5 whereby the proper needle may be brought to bear in the groove of the record. For example, the supporting pickup mechanism may provide for turning the transducer structure through 180° about the axis of the magnetic core. Means for accomplishing this are known.

The transducer system of FIGS. 6 and 7 is similar to that shown in FIGS. 4 and 5, being a two-needle unit, and differs in that the two gaps are disposed at opposite ends of the magnetic core. Core elements 2*b* and 3*b* are suitably supported to provide gaps 4*c* and 4*d* and a pair of coils, 8 and 8*a*, are arranged on the respective legs of the core formed by these elements. Permanent magnets 5*c* and 5*d* are suitably supported in the respective gaps for oscillation about their axes. Needle tips 7*c* and 7*d*, mounted in needle shanks 6*c* and 6*d*, are attached to the magnet armatures, one of the two needles being designed to play one type of record if desired, and the other needle being adapted to play a different type of record. The direction of movement of the record with reference to the respective needle styluses is indicated by arrows 9*b*. Suitable mechanism is provided for bringing the proper needle into playing position. If desired, and as necessary for certain phonograph applications, needle 6*d* may extend in the opposite direction from that shown, that is, to the left instead of to the right as illustrated in FIG. 7.

The transducer system of FIG. 8 is an example of one which employs only a single coil 8. Although a single unitary electromagnet core piece could be used, adjustment of the working gap 4 is conveniently provided by the use of two core elements 2*c* and 2*d* supported in proper relationship by a strap element 13, which may be of magnetic material to bridge the gap 10*a* or may be non-magnetic to maintain gap 10*a* in the flux path as and for the purposes hereinbefore described with reference to FIG. 3.

Referring, now, to the complete phonograph pickup cartridge illustrated in FIGS. 9–18 by way of an example of one suitable form of cartridge structure embodying a typical transducer system as above described, this particular form is designed for use with a straight phonograph pickup arm 37 illustrated in dot-dash lines. The transducer system selected for exemplification is that having two coils and a two-gap symmetrical magnetic core structure above described with reference to FIG. 3. The exploded view of FIG. 18 shows the several parts of the transducer assembly in detail and indicates their arrangement in the device.

In this structure, the two legs of magnetic core 1 is formed by L-shaped core elements 1*c* and 1*d* and pole piece extension elements 2 and 3. Coils 8 and 8*a* are arranged upon the respective legs of the core. Coil bobbins 8*c* of insulating material provide support for the respective coils and assured electrical insulation from the magnetic core structure. A U-shaped spacer 14 of non-magnetic material such as thin bronze, serves as a key to lock the rearward portion of the magnetic core and coil assembly together while maintaining the desired gap 10 between the opposed end faces of core elements 2 and 3.

At the forward end of the magnetic core and coil structure, the end portions of magnetic core elements 2 and 3, which form the pole pieces, are spaced apart the proper distance to establish working gap 4. For reasons that will become apparent as the description proceeds, core element 2 is bent inwardly to locate gap 4 at a point somewhat offset from the longitudinal axis of the magnetic core assembly, this being, as will be seen, a matter of convenient design rather than for functional advantage. An elongated, transversely magnetized permanent magnet 5 having a square cross-section is mounted at gap 4 for oscillation about its axis in consequence of the driving force of stylus tip 7 affixed in shank 6.

The needle stylus of the pickup, including shank 6 and stylus tip 7, is firmly and permanently affixed to the permanent magnet armature 5 at the bottom extremity thereof. Since the tip wears and must be replaced from time to time, this armature-stylus assembly, comprising the entire moving system of the transducer, is removably mounted in the pickup cartridge. Two bearing blocks 15 and 16, of elastomeric material, are provided for this purpose. While both of these bearing elements are designed to permit the oscillation of magnet armature 5 necessary for the proper functioning of the transducer, and to provide the restoring force tending to return the armature assembly to its normal rest position and accomplish the desired degree and character of damping of the moving system, bearing block 15 also serves, in accordance with the invention, as a socket to receive and properly orient magnet armature 5 at the gap 4. As is shown in the detail cross-sectional views of FIGS. 11 and 12, the socket-bearing 15 is formed with four tapering surfaces 17 which converge upwardly to the mouth of a well 18 which extends upwardly into the block. The cross-sectional configuration and dimensions of well 18 conform to the cross-section of at least the upper extremity of permanent magnet 5 intended to be inserted into the socket well; that is, the well is square in section and, since the socket-bearing 15 is designed to hold the armature in the pickup assembly, the well 18 is preferably slightly smaller in section than the magnet to assure a resilient grip upon the latter when it has been inserted into the socket. The sloping surfaces 17 form a funnel-like entryway for guiding the end of the magnet into the socket well as the needle stylus assembly is inserted into its proper position in the pickup.

It may be pointed out here that the armature and stylus orienting function of the socket-bearing 15 may be accomplished by providing mating cross-sectional shapes other than square, and the cross-sectional configuration of the upper end of the permanent magnet, which is designed to enter the socket well, need not be the same as that of the portion of the magnet which lies in the gap 4. For example, a round magnet, as illustrated in FIGS. 4 and 6, may be used, a square or triangular section, for example, being soldered or otherwise provided at the top end of the magnet. If desired, a flat may be provided at the top end portion of a round magnet to orient the armature-stylus assembly in a socket having a well with a corresponding flat. The magnet may be somewhat rectangular or have other polygonal cross-section, or the top end may be a flat element adapted to fit into a slot in the socket. The choice of shape depends on convenience, ease and certainty of orientation in the socket, preferred shape of magnet, and the practical combinations.

As is best shown in FIG. 11, both sides of the block 15 of elastomeric material are undercut to form shoulders 19 and spaced vertical plane surfaces 20. The distance between these vertical surfaces 20 is equal to the distance between the pole faces at the forward extremities of magnetic core members 2 and 3 which define the air gap 4. As is best seen in FIGS. 10 and 15, block 15 is fitted into the transducer structure with vertical surfaces 20 in engagement with portions of the pole faces of air gap 4, shoulders 19 resting upon the upper edges of the pole piece portions of magnet core elements 2 and 3. Conveniently, the top surface 21 of block 15 is sloping to conform to the slope of the top of the pickup cartridge structure.

Bearing block 16 is provided with a square central opening 22, conforming in shape and size to the cross-section of permanent magnet 5, and is mounted in the bottom of the cartridge to support the magnet armature near its lower end. Since the purpose of bearing block 15, in addition to properly locating the permanent magnet 5 in gap 4, is to provide, along with block 15, the desired damping and restoring force tending to return the armature-stylus assembly to its normal position, and since it is necessary that the permanent magnet 5 pass through opening 22 when a needle assembly is removed or inserted, the size of opening 22 should be such that the block 16 will engage the surfaces of that part of the magnet which is within opening 22 when the needle assembly is fully inserted into socket-bearing 15, but the fit must not be so tight as to interfere with movement of the permanent magnet through hole 22 during insertion or removal of the armature magnet.

Coils 8 and 8*a* are connected in series at 8*d* and a co-axial type of connector 23 is mounted at the rear of the pickup cartridge for insertion into a cooperating socket in the end of the phonograph pickup arm 14. This connector element comprises a sleeve 24 which projects rearwardly from the cartridge and a center pin 25 rigidly supported within and spaced and insulated from the sleeve by electrically insulating material 26. A collar 27 having locating nibs 28 encircles the inner portion of sleeve 24, the nibs being adapted to cooperate with corresponding grooves in the connector socket in the end of the phonograph pickup arm to locate the cartridge in proper playing position upon the arm. The inner end 29 of pin 25 is conveniently brought out laterally through a slot 30 in sleeve 24 for connection therewith of coil terminal 8*e* of coil 8*a*. Terminal 8*f* is connected, as by soldering, to sleeve 24. The transducer coil and core assembly is arranged within a magnetic shield 31 of suitable high permeability magnetic shielding material. The shield structure, shown separately in FIG. 17, almost entirely encloses the transducer assembly, the rear end of the shield structure being open to permit insertion of the transducer assembly into the shield, and openings 31*a* and 31*b* being provided for access to the working gap of the magnetic core.

The entire transducer assembly, including the core and coil structure, shielding, and connector are potted in a suitable cartridge body 32. Any suitable thermoplastic or cold setting potting composition or casting resin may be used for this purpose. Suitable molding cores are inserted from top and bottom of the transducer assembly to prevent flow of potting compound into the magnetic core gap and to provide recesses into which bearing blocks 15 and 16 may subsequently be inserted and cemented. Finally, a top shield plate 32, which may also serve as a name plate, if desired, is cemented into position to cover socket-bearing 15, and a bottom shield plate 33, having an opening 34 therein for the needle stylus assembly, is cemented to the bottom of the pickup cartridge. Needle guards 35 flank the needle shank 6, being formed, in the example illustrated, as an integral part of bottom plate 33. Such guards may, if desired, be provided by separate elements, their purpose being to protect the pickup device from damage in event that the tone arm is inadvertently dropped upon the record or other surface.

In all embodiments of the invention herein shown and described by way of example, the armature consists of a transversely magnetized elongated permanent magnet, that is, a magnet whose axial dimension is at least several times its thickness, the latter being the distance between the extremities of the opposite poles of the magnet. This novel armature magnet structure not only minimized the inertia of the moving system of the transducer, as above described, but also makes possible a magnet core gap of minimum magnitude with resulting improvement in transducer efficiency. Additionally, this form of armature is conveniently adapted to serve as its own shaft for bearing mounting purposes and for connection to the stylus.

Since the permanent magnet used in the transducer system herein described is comparatively very small, the strength of its magnetic field is correspondingly small and, although sufficient to create the desired signal voltages in the coils, the magnetic field exteriorly of the cartridge is negligible. Thus, magnetic attraction between the pickup and any magnetic part of the phonograph turntable, which might cause changes in pressure of the needle tip in the record groove and consequent distortion of reproduction, or otherwise cause extraneous signals, is negligible.

It will be understood that the complete pickup cartridge structure can be adapted as required to accommodate any one of the several forms of transducer systems illustrated in FIGS. 1–8, and that parts shown and described with reference to one particular example of the invention may be used with any of the other forms. Particularly, it may be noted that the direction in which the needle stylus extends from the magnet armature may be arranged in accordance with the requirements of particular applications. Also, the needle arm is not necessarily mounted at an angle to the magnet plane of the armature, but may lie in this plane, especially when the pickup arm is properly curved. As is indicated in the foregoing description, the square magnet shape is preferred, having functional and practical advantages, but other shapes may be employed.

Invention is claimed as follows:

1. A phonograph pickup transducer system comprising an electromagnet including a core having a working gap therein and a coil disposed on said core, an armature comprising a permanent magnet operatively supported in said gap for oscillatory movement of the magnet in the gap, an elastomeric socket bearing operatively supporting the magnet in the gap, said elastomeric bearing engaging a portion of said magnet and having a configuration complementary to the configuration of the portion of the magnet engaged thereby and providing an interlocking relation therebetween, and needle stylus means secured to and extending outwardly from said permanent magnet.

2. A phonograph pickup transducer system comprising an electromagnet including a core having a working gap therein and two substantially parallel legs, and a coil arranged on each of said legs, said coils being connected in series and having turns in a direction to provide additive core flux inducing voltages, an armature comprising a permanent magnet operatively supported in said gap for oscillatory movement of the magnet in the gap, an elastomeric socket bearing operatively supporting the magnet in the gap, said elastomeric bearing engaging a portion of said magnet and having a configuration complementary to the configuration of the portion of the magnet engaged thereby and providing an interlocking relation therebetween, and needle stylus means secured to and extending outwardly from said permanent magnet.

3. A phonograph pickup transducer system comprising an electromagnet including a core having a working gap therein and a coil disposed on said core, an armature comprising a permanent magnet operatively supported in said gap for oscillatory movement of the magnet in the gap and wherein at least the portion of the permanent magnet located in the gap is square in cross section, an elastomeric socket bearing operatively supporting the magnet in the gap, said elastomeric bearing engaging a portion of said magnet and having a configuration complementary to the configuration of the portion of the magnet engaged thereby and providing an interlocking relation therebetween, and needle stylus means secured to and extending outwardly from said permanent magnet.

4. A phonograph pickup transducer system comprising an electromagnet including a core having a working gap therein and a coil disposed on said core, an armature comprising a permanent magnet operatively supported in said gap for oscillatory movement of the magnet in the gap, an elastomeric socket bearing operatively supporting the magnet in the gap, said elastomeric socket bearing engaging a portion of said magnet and having a configuration complementary to the configuration of a portion of the magnet engaged thereby and providing an interlocking relation therebetween, needle stylus means secured to and extending outwardly from said permanent magnet, said permanent magnet being demountably supported in the working gap whereby the armature stylus assembly may be withdrawn from and inserted into the transducer system assembly.

5. A phonograph pickup transducer system comprising an electromagnet including a core having a working gap therein and a coil disposed on said core, said core having a balancing gap therein at a location remote from said working gap, an armature comprising a permanent magnet operatively supported in said working gap for oscillatory movement of the magnet in the working gap, elastomeric bearing means operatively supporting the magnet in the working gap, said elastomeric bearing means engaging a portion of said magnet and having a configuration complementary to the configuration of the portion of the magnet engaged thereby and providing an interlocking relation therebetween, and needle stylus means secured to and extending outwardly from said permanent magnet.

6. An armature stylus assembly for use in a phonograph pickup comprising an elongated transversely magnetized permanent magnet having a needle stylus permanently affixed thereto and extending laterally from one end thereof at an angle of approximately 18° from the magnet plane of said permanent magnet.

7. A phonograph pickup transducer system comprising an electromagnet including a core having a working gap therein and a coil disposed on said core, an armature comprising a permanent magnet operatively supported in said gap for oscillatory movement of the magnet in the gap, an elastomeric socket bearing operatively supporting the magnet in the gap, said elastomeric bearing having a configuration complementary to the configuration of the portion of the magnet engaged thereby and providing an interlocking relation therebetween, said elastomeric socket bearing including a first bearing of elastomeric material in said body at one end of said gap and having an opening facing toward said gap, and an apertured second bearing of elastomeric material aligned with said first bearing and disposed at the other end of said gap, and needle stylus means secured to and extending outwardly from said permanent magnet.

References Cited in the file of this patent

UNITED STATES PATENTS

| | | |
|---|---|---|
| 1,689,358 | Miller | Oct. 30, 1928 |
| 2,501,233 | O'Brien | Mar. 21, 1950 |
| 2,507,708 | Greener | May 16, 1950 |
| 2,511,663 | Bachman | June 13, 1950 |
| 2,615,990 | Blaney et al. | Oct. 28, 1952 |
| 2,769,866 | Kornei | Nov. 6, 1956 |
| 2,897,443 | Mendelsohn et al. | July 28, 1959 |

FOREIGN PATENTS

| | | |
|---|---|---|
| 336,648 | Great Britain | Oct. 15, 1930 |
| 896,121 | Germany | Nov. 9, 1953 |

OTHER REFERENCES

Wittenberg, N.: Philips' Technical Library, vol. 18, pp. 101–109, 1956–57.

From Microphone to Ear, Philips' Technical Library, p. 28, 1956.